United States Patent
Pasquet et al.

(10) Patent No.: US 9,562,514 B2
(45) Date of Patent: Feb. 7, 2017

(54) WIND TURBINE ROTOR WITH PITCH BRAKE

(75) Inventors: Pierre Pasquet, Alella (ES); Santiago Canedo Pardo, Barcelona (ES)

(73) Assignee: Alstom Wind S.L.U., Barcelona (ES)

( * ) Notice: Subject to any disclaimer, the term of this patent is extended or adjusted under 35 U.S.C. 154(b) by 928 days.

(21) Appl. No.: 13/824,299

(22) PCT Filed: Sep. 20, 2011

(86) PCT No.: PCT/EP2011/066274
§ 371 (c)(1),
(2), (4) Date: Mar. 15, 2013

(87) PCT Pub. No.: WO2012/038395
PCT Pub. Date: Mar. 29, 2012

(65) Prior Publication Data
US 2013/0177423 A1    Jul. 11, 2013

(30) Foreign Application Priority Data
Sep. 20, 2010    (EP) .................................... 10382250

(51) Int. Cl.
*F03D 7/02*    (2006.01)

(52) U.S. Cl.
CPC ......... *F03D 7/0224* (2013.01); *F05B 2260/79* (2013.01); *F05B 2260/902* (2013.01); *Y02E 10/723* (2013.01)

(58) Field of Classification Search
CPC ............ F03D 7/0224; F03D 3/06; F03D 7/02; F16D 55/225
See application file for complete search history.

(56) References Cited

U.S. PATENT DOCUMENTS

| | | | | |
|---|---|---|---|---|
| 6,067,429 A | * | 5/2000 | Sugaya | F16D 49/00 106/36 |
| 6,308,806 B1 | * | 10/2001 | Nielsen | B62L 3/00 188/24.11 |
| 6,609,889 B1 | * | 8/2003 | Vilsboll | F03D 7/0224 415/4.3 |

(Continued)

FOREIGN PATENT DOCUMENTS

| | | |
|---|---|---|
| CN | 101583793 | 11/2009 |
| DE | 20 2005 014699 | 8/2005 |

(Continued)

OTHER PUBLICATIONS

International Search Report and Written Opinion for PCT/EP2011/066274, mailed Oct. 17, 2011, 10 pgs.

*Primary Examiner* — Thomas Denion
*Assistant Examiner* — Shafiq Mian
(74) *Attorney, Agent, or Firm* — Dority & Manning, P.A.

(57) ABSTRACT

Wind turbine rotor comprising a hub, a plurality of blades, and at least one pitch system for rotating a blade substantially along its longitudinal axis and comprising one or more pitch brakes, wherein a pitch brake comprises at least a brake disc element and a first brake pad, and wherein one of the hub and a blade comprises said brake disc element and the other of the hub and blade comprises said first brake pad, the brake disc element and brake pad being arranged such that when the blade is substantially in or near the below rated pitch position the brake disc element and pad are in frictional contact with each other.

19 Claims, 11 Drawing Sheets

(56) References Cited

U.S. PATENT DOCUMENTS

| | | | |
|---|---|---|---|
| 8,864,464 B2* | 10/2014 | Diaz de Cerio Garcia de Mendaza et al. | F03D 7/0248 188/71.1 |
| 2001/0043021 A1* | 11/2001 | Laoun | H02K 5/1737 310/156.32 |
| 2005/0284990 A1* | 12/2005 | Souza | F16M 11/10 248/122.1 |
| 2006/0283673 A1* | 12/2006 | Lamport | F16D 65/0025 188/251 R |
| 2010/0014972 A1 | 1/2010 | Steffensen | |
| 2010/0038191 A1* | 2/2010 | Culbertson | F16D 55/226 188/72.6 |
| 2011/0044813 A1* | 2/2011 | Lindberg | F03D 7/0224 416/1 |

FOREIGN PATENT DOCUMENTS

| | | |
|---|---|---|
| DE | 10 2006 029640 | 1/2008 |
| EP | 1 816 346 | 8/2007 |
| EP | 1 916 417 | 4/2008 |
| EP | 1 939 446 | 7/2008 |
| EP | 2 058 513 | 5/2009 |
| WO | WO 99/23384 | 5/1999 |
| WO | WO 2005/019542 | 3/2005 |
| WO | WO 2007/098759 | 9/2007 |

* cited by examiner

WIND TURBINE ROTOR WITH PITCH BRAKE

The present invention relates to a wind turbine rotor, and more particularly to a wind turbine rotor comprising one or more pitch systems for rotating one or more blades substantially along their longitudinal axis.

BACKGROUND ART

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft drives the generator rotor either directly ("directly driven wind turbine" or "direct drive wind turbine") or through the use of a gearbox.

An important auxiliary system generally provided on wind turbines is a pitch system. Pitch systems are employed for adapting the position of a wind turbine blade to varying wind conditions by rotating the blade along its longitudinal axis. In this respect, it is known to rotate a wind turbine blade in such a way that it generates less lift (and drag) when the wind speed increases. This way, even though the wind speed increases, the torque transmitted by the rotor to the generator remains substantially the same. It is furthermore also known to rotate wind turbine blades towards their stall position (so as to reduce the lift on the blades) when the wind speed increases. These wind turbines are sometimes referred to as "active-stall" wind turbines. Pitching may furthermore also be used for rotation of the blade towards its vane position, when a turbine is temporarily stopped or taken out of operation for e.g. maintenance.

Many pitch systems comprise an electric motor in the hub which drives an actuating gear. Said actuating gear (pinion) meshes with an annular gear provided on the wind turbine blade to set the wind turbine blade into rotation. It is also possible however, that the annular gear is provided on the hub, whereas the electric motor and actuator are mounted on the blade. Yet other actuating mechanisms, such as e.g. involving hydraulic actuators, are also known.

It is further known to provide an individual pitch system (comprising e.g. a separate motor and separate control) for each wind turbine blade of a rotor. It is also known to provide a common pitch system wherein the pitch angle of the blades is the same for all blades on a rotor. Such a common pitch system may comprise a single motor or may comprise a plurality of motors, one for each blade.

A common control strategy of a pitch system in a variable speed wind turbine is to maintain the blade in a predefined "below rated pitch position" at wind speeds equal to or below nominal wind speed (for example approximately 4 m/s-15 m/s). Said default pitch position may generally be close to a 0° pitch angle. The exact pitch angle in "below rated" conditions depends however on the complete design of the wind turbine. Above the nominal speed (for example from approximately 15 m/s-25 m/s), the blades are rotated to maintain the aerodynamic torque delivered by the rotor substantially constant. When the wind turbine is not operating, the blades may assume a vane position (e.g. at or around 90° pitch angle) to minimize the loads on the blades. During most of the wind turbine's life, a blade may however be in the below rated pitch position. The nominal wind speed, cut-in wind speed and cut-out wind speed may of course vary depending on the wind turbine design.

During operation of the wind turbine, forces may be acting on the blades that result in a constantly varying torque around the blade's longitudinal axis. These forces may include the aerodynamic torque around the longitudinal axis of the blade and also the weight of the blade which may exercise a torque around the blade's longitudinal axis, depending on the blade's position. Both these forces are non-constant, largely cyclical and tend to rotate the blade out of the position determined by the pitch control system.

When a pitch system involving gearing is used, the varying torque may result in flanks of the teeth of the actuating gear (pinion) and annular gear repeatedly touching each other. This repetitive contact may lead to fretting corrosion and premature wear. Since the below rated pitch position is the prevailing position for most wind turbines, the contact between the teeth and its consequences is concentrated on the same teeth.

Some solutions for these problems are known. It is e.g. known to provide an automatic lubrication system to try and prevent fretting corrosion. For example, DE 20 2005 014 699 U and EP 1 816 346 provide such lubrication systems. These lubrication systems may help to reduce fretting corrosion to a smaller or larger extent, but do not combat or resolve the problem underlying the corrosion. There still exists a need for a pitch system in a wind turbine which does not suffer from fretting corrosion. It is an object of the present invention to at least partially fulfil this need. Further advantages of the present invention will become apparent from its description.

SUMMARY OF THE INVENTION

In a first aspect, the present invention provides a wind turbine rotor comprising a hub, a plurality of blades, and at least one pitch system for rotating a blade substantially along its longitudinal axis, the pitch system comprising one or more pitch brakes, wherein a pitch brake comprises at least a brake disc element and a first brake pad, and wherein one of the hub and a blade comprises said brake disc element and the other of the hub and blade comprises said first brake pad, the brake disc element and brake pad being arranged such that when the blade is substantially in or near the below rated pitch position the brake disc element and pad are in frictional contact with each other.

In this aspect, when a blade is in or near its standard below rated pitch position, an additional frictional torque is provided. As long as the frictional torque inherent in the pitch system is higher than the torque acting on the blade (e.g. due to the weight of the blade), the blade will not rotate and any gearing of the pitch system will not be adversely affected by repetitive contact between teeth.

In preferred embodiments, the brake disc element and first brake pad are arranged such that when the blade is not in or near the below rated pitch position, the brake disc element and first brake pad are not in frictional contact with each other or in reduced frictional contact with each other. This way, the actuation and pitch control are only minimally affected; a more powerful pitch motor would not be necessary in these implementations.

In some embodiments, a pitch brake may comprise a second brake pad, and one of the hub and blade comprises said second brake pad, the second brake pad being arranged such that when the blade is substantially in or near the below rated pitch position, the first and second brake pads are in frictional contact with the brake disc element, the brake disc element being positioned between said first and second brake pads. This kind of arrangement may be useful both in active and passive braking systems, and represents an easy arrangement for providing friction in the below rated pitch position. Additionally, the forces in the direction of the blade's longitudinal axis that are generated between the braking elements may cancel each other out.

In some embodiments, the pitch brake may comprise means for increasing the frictional contact between the brake pads and brake disc element. The means for increasing the frictional contact between the brake elements may comprise e.g. a hydraulic or pneumatic circuit comprising a piston in a cylinder (active) or some form of spring means (passive).

In some embodiments, the default position of the first brake pad and/or second brake pad may be adjustable. In these embodiments, regardless of whether the brake system is active or passive, the frictional contact between brake pads and brake disc element may be adjusted in accordance with circumstances. This adjustment may occur during initial installation of the wind turbine or during maintenance.

In some embodiments, the pitch brake may be adapted to be used as a pitch lock system. For maintenance purposes, it may be required to be able to mechanically lock a wind turbine blade in a predetermined position.

In some embodiments, said first and second brake elements are passive. In other embodiments, at least one of the first and second brake elements may be active. When the elements are passive, the first and second brake elements need to be arranged in such a way that sufficient friction force is available in the below rated pitch position. When one or more elements are active, some form of control for the brake system may be provided that actuates to increase the frictional forces when the blade is in the below rated pitch position, and does not actuate on the braking elements when the blade is not in this pitch position. Alternatively, a form of control may be implemented that actuates in such a way as to reduce frictional forces when the blade is not in the below rated pitch position.

In some embodiments, a pitch system may comprise two or more pitch brakes. A plurality of pitch brakes may be arranged along the internal perimeter of a blade with a plurality of brake disc elements and brake pads. The choice of the number of pitch brakes applied in a blade may depend e.g. on manufacturing and maintenance cost, loads in each brake system, (a)symmetry of brake loads.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS OF THE INVENTION

Figure 1A:
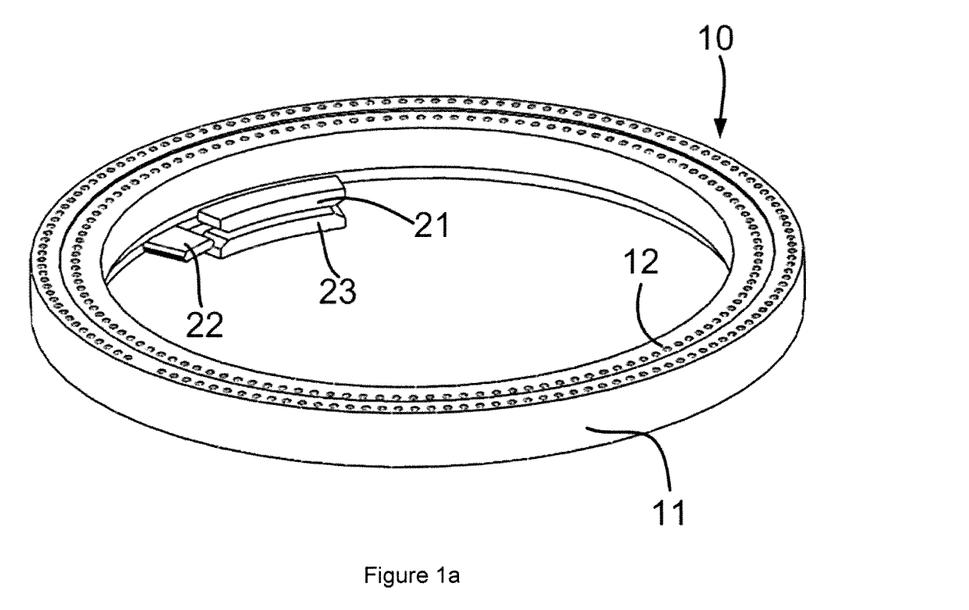
FIGS. 1a-1c schematically illustrate a first embodiment of a wind turbine rotor according to the present invention.
Figure 1B:
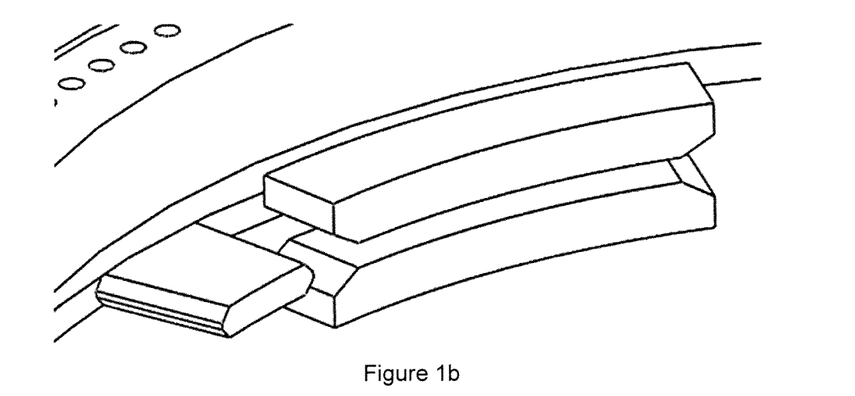
Figure 1C:
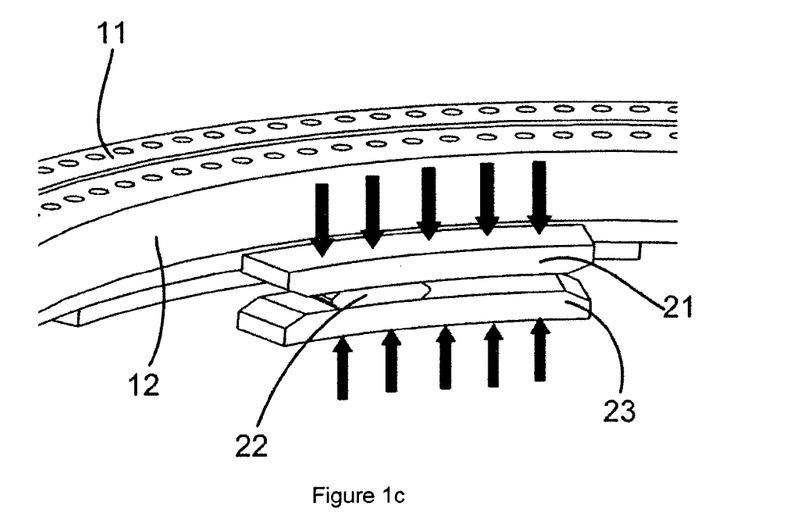

FIG. 1a illustrates an isometric partial view of a first embodiment of a wind turbine rotor according to the present invention, FIG. 1b shows an enlarged view of FIG. 1a, and FIG. 1c shows an enlarged view of the same embodiment with the blade in a different pitch position.

A pitch bearing 10 comprises an inner ring 12 and an outer ring 11. A wind turbine blade may be attached either at the bearing inner ring 12 or at the outer ring 11. The hub is connected at the other. When a pitch system (not shown) is actuated, the blade performs a relative rotational movement with respect to the hub. Also, the bearing inner ring will perform a rotational movement with respect to the bearing outer ring.

Attached at the inner ring in this embodiment is a first brake pad 21. A cooperating brake disc element 22 and a third brake pad 23 are provided on a neighbouring component. It can be seen that brake disc element 22 does not form a complete 360° annular disc. Within the scope of the invention, a brake disc element may be a complete 360° ring, but may also be a much smaller portion e.g. in the shape of a tongue such as depicted in FIG. 1 occupying a sector of 15°, 10°, 5° or less.

The first and second brake pads 21 and 23 may thus be mounted on either the blade or the hub. The brake disc element may be mounted on the other. When the blade rotates relative to the hub, the brake disc element thus moves relatively with respect to the first and second brake pads. In FIGS. 1a and 1b, the blade is in a first position, wherein the pitch angle is not equal to the pitch position that the blade assumes when the wind turbine is operating below rated wind speed. In FIG. 1c, the same configuration is shown, but the blade is now in the below rated pitch position.

It may be seen from FIGS. 1a-1c, that due to the geometrical arrangement of blade disc element and brake pads, when the blade is in or near the below rated pitch position, an additional frictional force is available, counteracting rotation of the blade. The pitch brake does not need to be activated for the frictional contact to be established. The brake pads do not need to move with respect to the plane of the brake disc element for the frictional contact to be established. When the blade is not in or near the below rated position, the additional frictional force is not present.

The braking elements 21, 22 and 23 may be made from e.g. elastomers but also from any other suitable material. The choice of material may depend e.g. on the wear of the elements, the necessary frictional force, cost of material and dimensions of the brake elements. In some implementations, additional friction force may be provided by e.g. springs acting on the first and second brake pads (schematically indicated in FIG. 1c). Also, in some embodiments, the relative positions between the brake elements may be adjustable to increase or decrease the frictional force in accordance with the wind turbine design. Such an adjustment may be made e.g. during maintenance. By changing the relative vertical (in FIG. 1) positions of brake pads and brake disc elements, the inherent frictional force when they are in contact can be influenced.

Figure 2A:
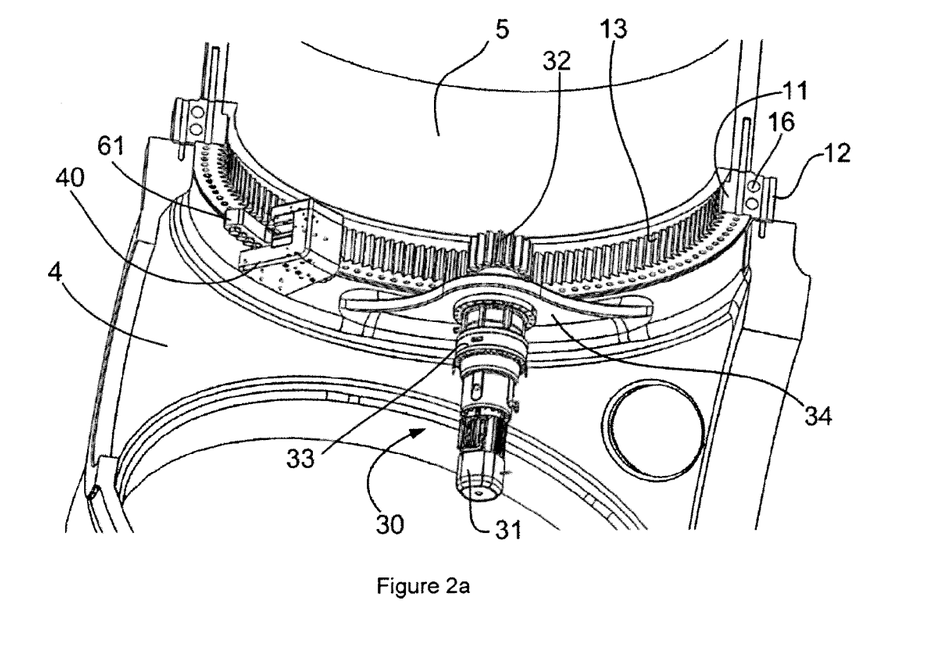
FIGS. 2a-2c illustrate a second embodiment of a wind turbine rotor according to the present invention.
Figure 2B:
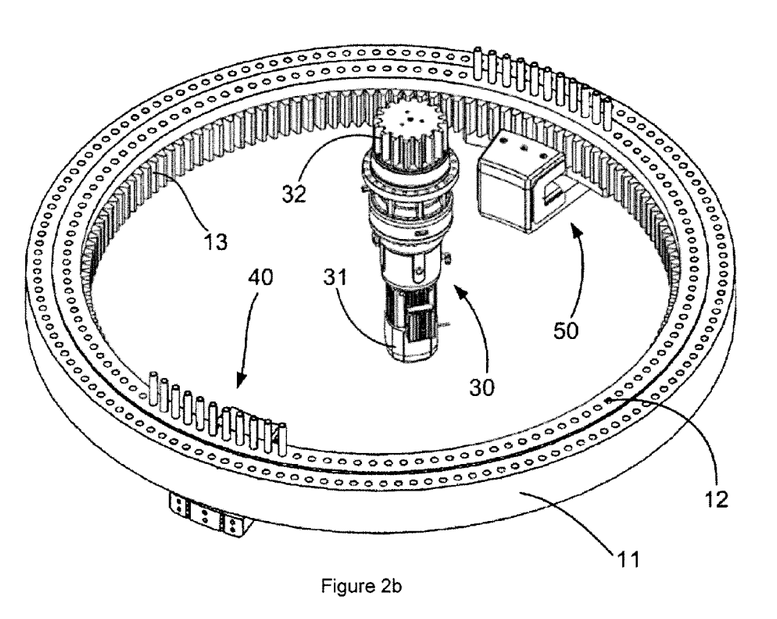
Figure 2C:
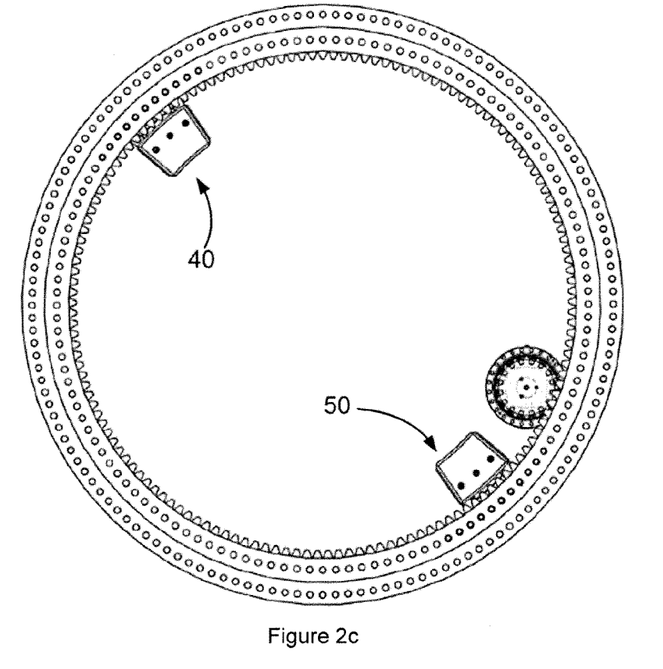

FIG. 2a illustrates a second embodiment of a wind turbine rotor according to the present invention. FIGS. 2b and 2c show different views of the same embodiment.

In FIG. 2, a blade root 5 is rotatably mounted at hub 4 through a pitch bearing. The outer bearing ring 12 is attached to the hub, whereas the inner bearing ring 11 is attached to the blade. The bearing comprises two rows of spherical rolling elements 16. An annular pitch gear is machined in the inner bearing ring 11. A pitch system 30 comprising a pitch motor 31, reductor 33 and a pinion 32 is provided. A flange 34 of the hub supports the pitch motor and reductor. Pinion 32 meshes with annular gear 13, such that upon actuation of pitch motor 31, the blade can be rotated along its longitudinal axis. It should be noted that also in this embodiment, the blade could be attached either at the outer or at the inner bearing ring.

In this embodiment, a first pitch brake caliper 40 and a second pitch brake caliper 50 are provided (see FIG. 2*b*, which shows an isometric view of the complete system, but without the blade and hub. Also see FIG. 2*c*, which provides a top view of FIG. 2*b*). The calipers 40 and 50 comprise brake pads, which enter into contact with brake disc elements (not visible in FIG. 2) when the blade is in the below rated pitch position.

Figure 3A:
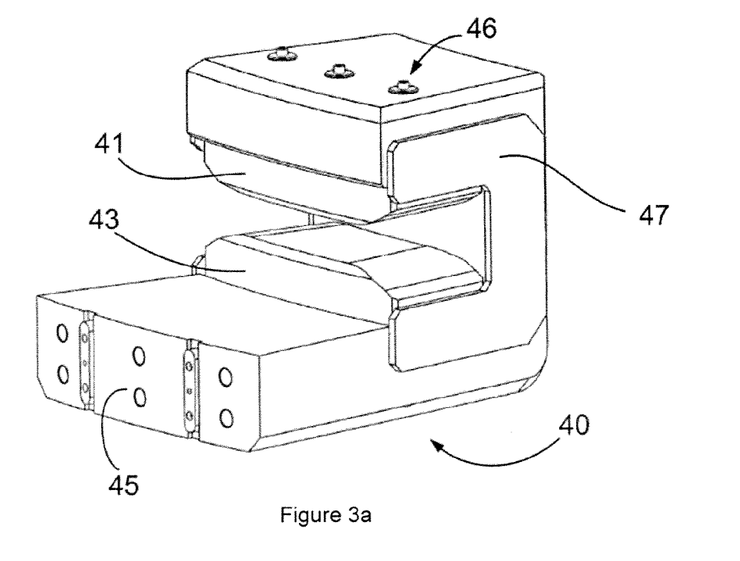
FIGS. 3a-3c illustrate some details of some of the components shown in FIG. 2.
Figure 3B:
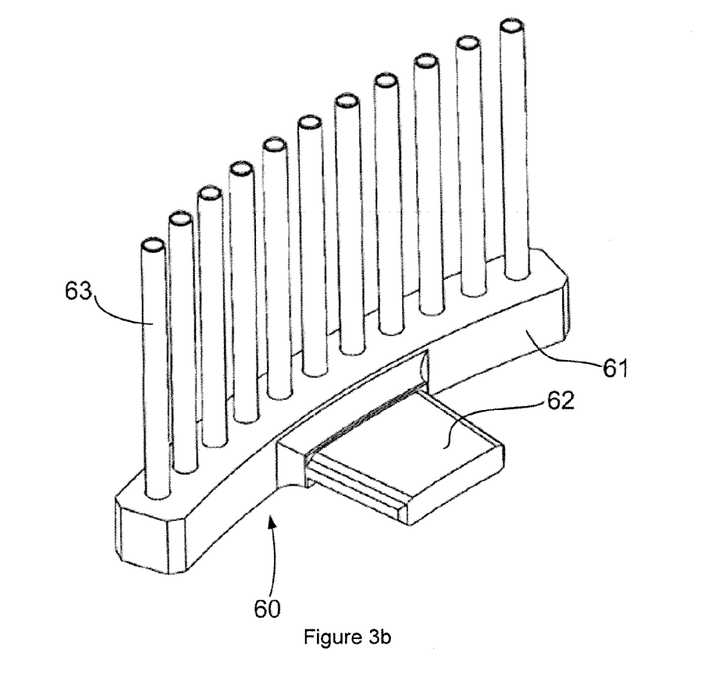
Figure 3C:
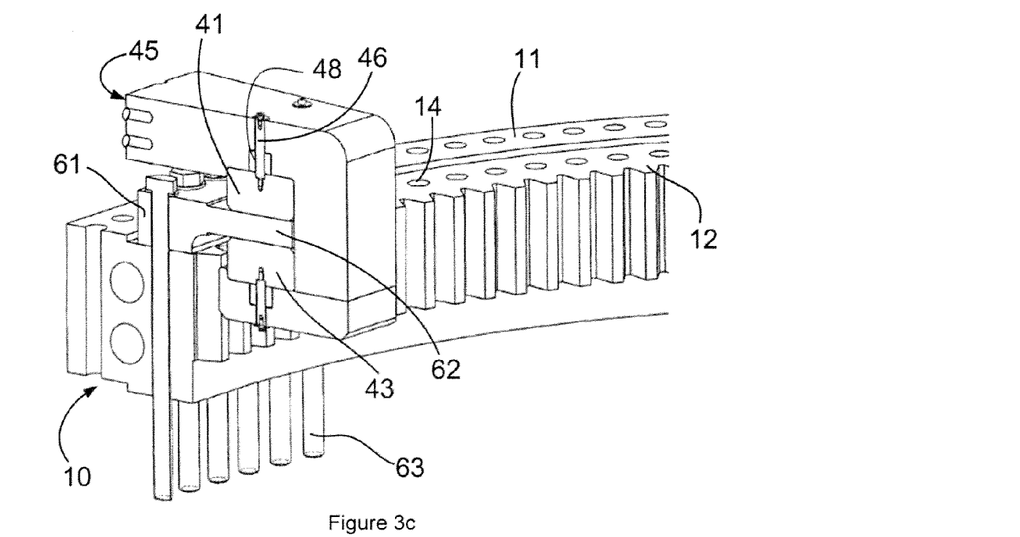

FIGS. 3*a*-3*c* illustrate some details of some of the components shown in FIG. 2. With reference to FIG. 3*a*, a brake caliper 40 is shown housing brake pads 41 and 43 in a caliper base. Brake caliper 40 further comprises a mounting surface 45 which may be adapted to be mounted on e.g. the hub. To this end, mounting surface 45 may be provided with e.g. suitable mounting holes and optionally fasteners. In alternative embodiments, at least part of the brake caliper may be integrally formed with the hub.

Brake caliper 40 may further comprise a removable cap 47 for closing the space wherein the brake pads 41 and 43 are arranged. During maintenance, such a cap 47 may easily be removed so that also the brake pads may easily be inspected, removed, repaired or substituted.

Brake caliper 40 may also comprise one or more screws 46 or similar for fixing brake pads in their position. In FIG. 3*c* it may be seen that in the hole of the screw 46, a space is provided in which e.g. a compression spring may be fitted for providing a force that increases the friction between brake disc element 62 and brake pads 41 and 43. As an alternative to a helical compression spring, a cylindrical elastomer spring may also be used. In yet further embodiments, the brake pads may be actively controlled and may be actuated upon by regulating pneumatic or hydraulic pressure acting on the pads. It should be noted however that the brake calipers are fixed calipers i.e. the legs of the caliper do not move towards the plane of the brake disc element.

Active systems may further be designed to be fail-safe: the control may be designed such that the default frictional force is low when the control fails. Alternatively, the control may be designed such that the default frictional force is high when the control fails (in these cases, the control system would reduce frictional force upon actuation).

Furthermore, in further embodiments, the default position of the brake pads may be adjustable using screws 46. Positioning the brake pads closer together will increase the inherent frictional force upon contact between brake disc element and brake pads.

FIG. 3*b* illustrates a brake disc mount 60 comprising brake disc element 62 and annular segment 61 provided with a plurality of holes. Studs 63 may be fitted in these holes and the brake disc mount may thus be attached to inner bearing ring 12 (see FIG. 3*c*). In the mounted position, studs 63 extend through holes 14 provided on inner bearing ring 12.

Also shown in FIG. 3*c* is pitch bearing 10 In the figure, the pitch bearing is depicted as a double row roller bearing, but it will be clear that alternative pitch bearings may also be used. It will furthermore be clear that alternative arrangements of the attachment of the blade to the hub do not significantly affect the effects of the invention: for example a blade could be attached at the outer bearing ring and the inner bearing ring could be attached to the hub and/or the annular gear could be connected to the hub instead of to the blade and/or a hub may comprise an extender (in this case, one of the brake disc element and brake pad(s) may be attached to the extender).

Figure 4A:
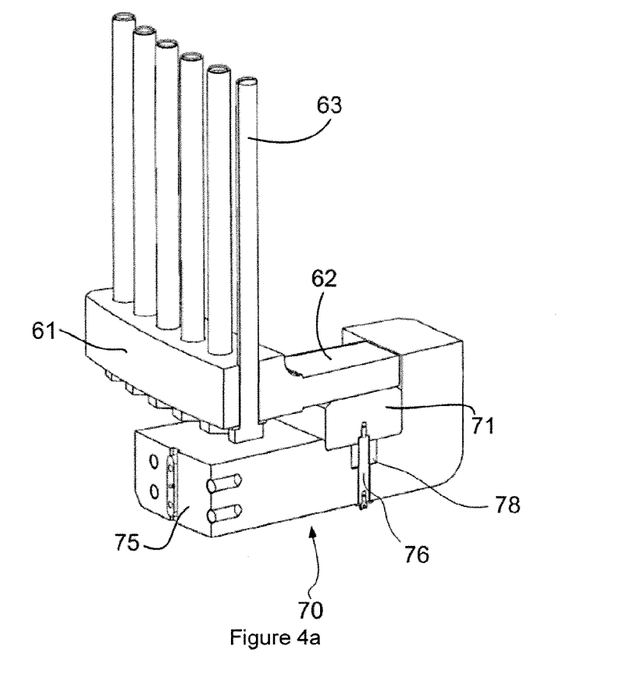
FIGS. 4a-4b illustrate a further alternative embodiment of parts of a rotor in accordance with the present invention.
Figure 4B:
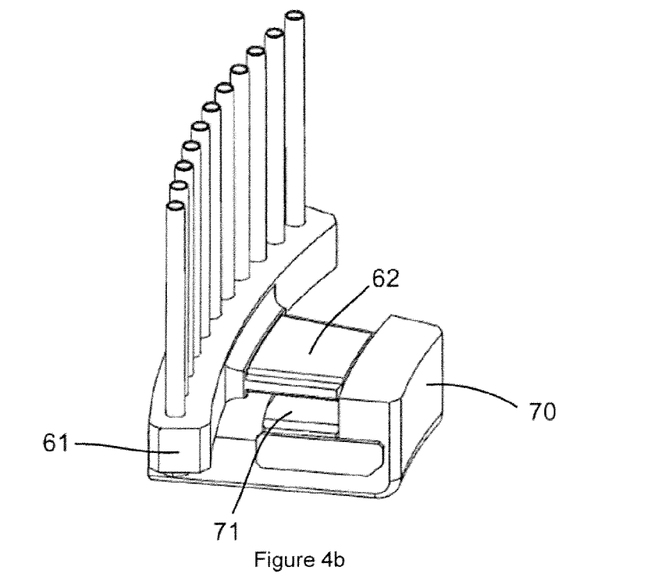

FIGS. 4*a*-4*b* illustrate a further alternative embodiment in accordance with the present invention. In the embodiment of FIG. 4, a brake caliper 70 comprises only a single brake pad 71, which depending on their relative position can enter into frictional contact with the brake disc element 62. Further aspects of the brake caliper 70 largely correspond to the brake caliper 40, shown in FIG. 3. An advantage of the brake calipers with a single brake pad 71 is that the manufacturing may be easier and cheaper. An advantage of brake calipers with two brake pads is that during braking, the forces in the longitudinal direction of the blade and perpendicular to the braking force cancel each other out.

Figure 5A:
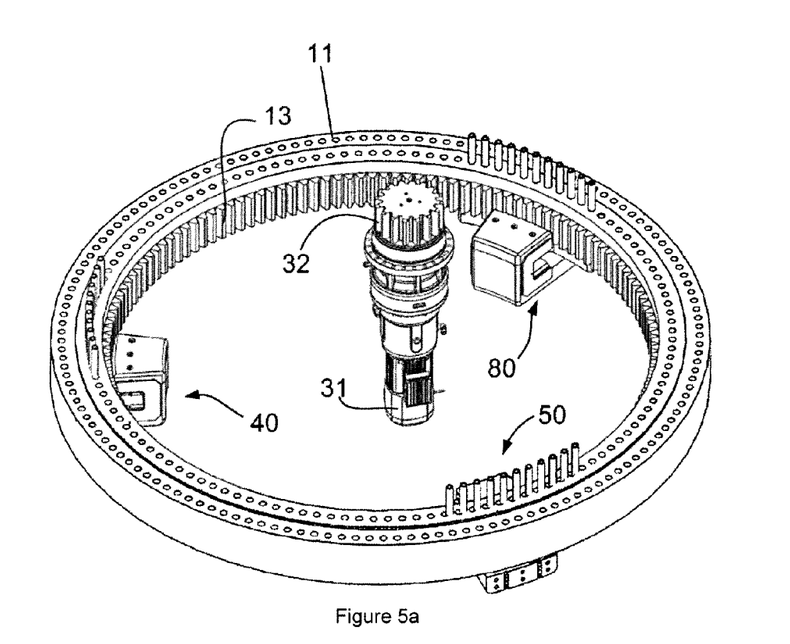
FIGS. 5a-5b illustrate two further embodiments of a wind turbine rotor according to the present invention.
Figure 5B:
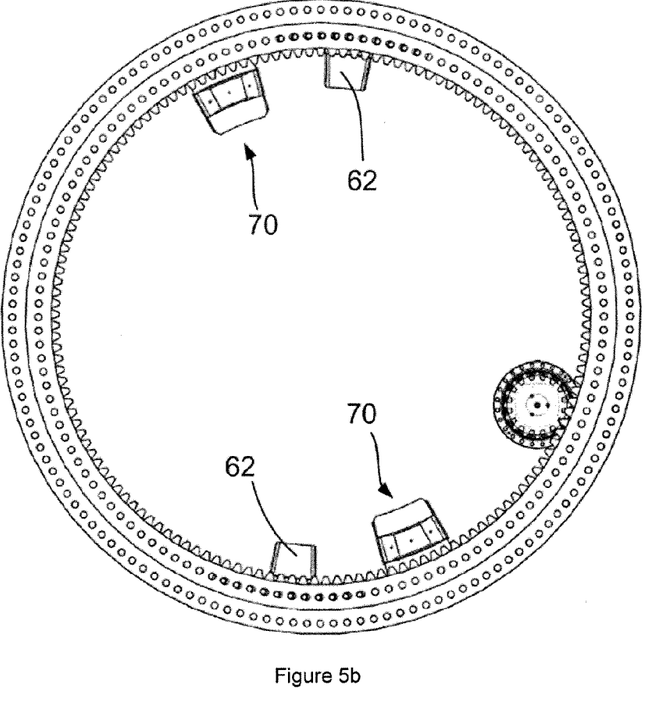

FIGS. 5*a*-5*b* illustrate two further embodiments of a wind turbine rotor according to the present invention. In FIG. 5*a*, within a single blade, three pitch brakes have been provided. In this embodiment, three brake calipers 40, 50 and 80 are provided, each having two brake pads. Each of the brake calipers has a corresponding brake disc element (not visible in the below rated pitch position).

Providing a plurality of pitch brakes in a single blade can reduce the necessary friction forces in each of the pitch brakes. Additionally, the brake loads may be more symmetric with respect to the longitudinal axis of the blade.

In FIG. 5*b*, two pitch brakes are provided. Both brake calipers 70 shown in FIG. 5*b* comprise a single brake pad. In the situation of FIG. 5*b*, the blade is not in its below rated pitch position. When the blade is in its below rated position, the brake disc elements 62 will be in frictional contact with the brake pads.

Figure 6A:
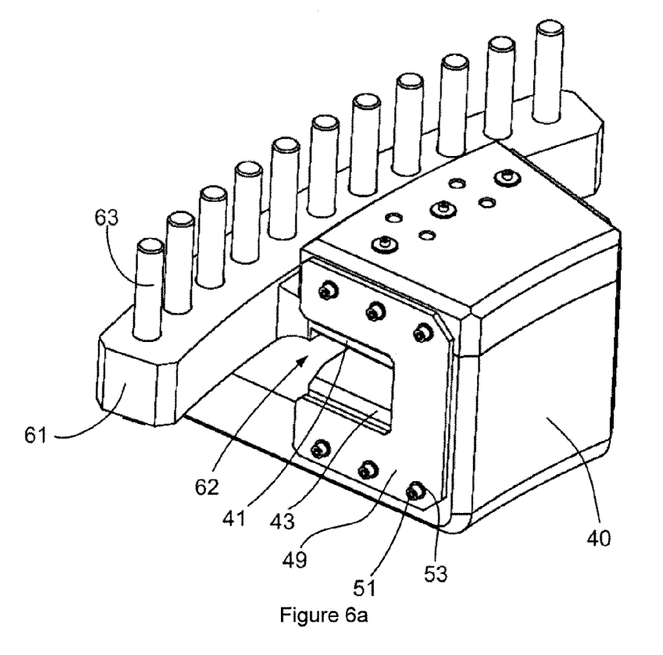
FIGS. 6a-6c illustrate two further embodiments of the present invention.

FIG. 6*a* illustrates a rotor comprising a brake disc element 62 (not visible) connected to a blade and a caliper 40 having brake pads 41 and 43 connected to a hub. The sides of the caliper 40 may comprise a removable cap 49. Cap 49 can be attached and removed using fasteners 51 housed in holes 53. In the situation shown, the pitch brake system is not in the "lock" position.

Figure 6B:
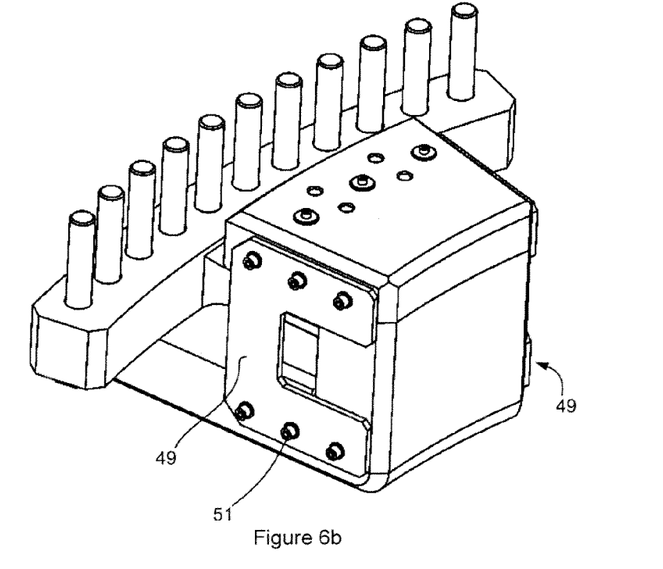

In FIG. 6*b*, the same embodiment is shown, but in a situation wherein the blade is locked for e.g. maintenance. By simple flipping of the caps 49 on either side of the brake disc element 62, and by using the same fasteners 51 and holes 53, the brake disc element 62 (and thus the blade) is locked in its current position.

Figure 6C:
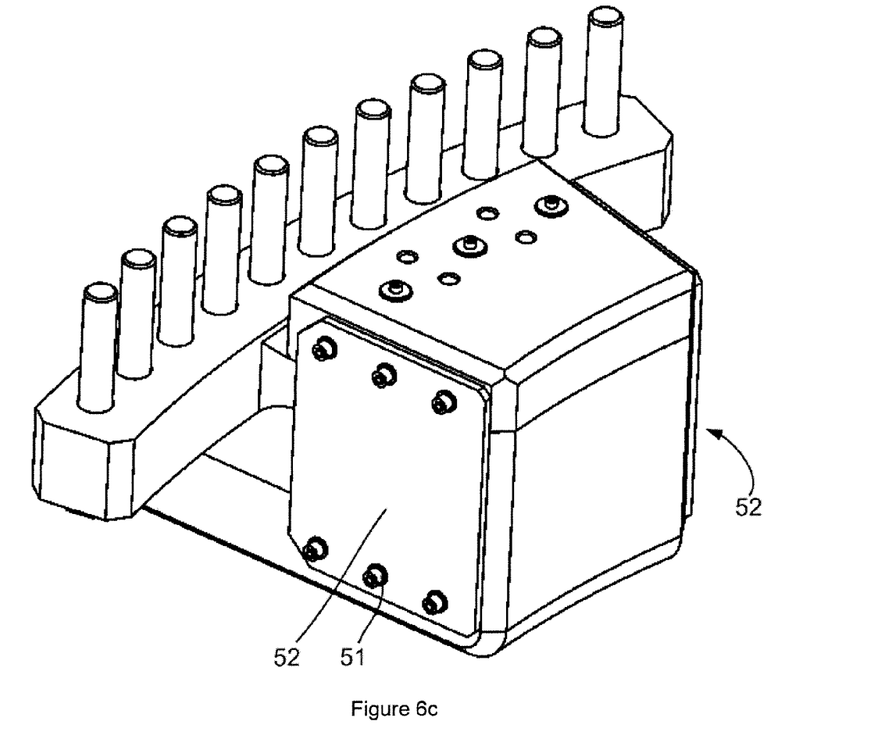

In FIG. 6*c*, an alternative embodiment is shown comprising alternative caps 52 which may be mounted for maintenance, but need to be removed (or replaced with different caps) for normal operation. In these embodiments, caps 49 and 52 serve as locking elements.

Figure 7A:
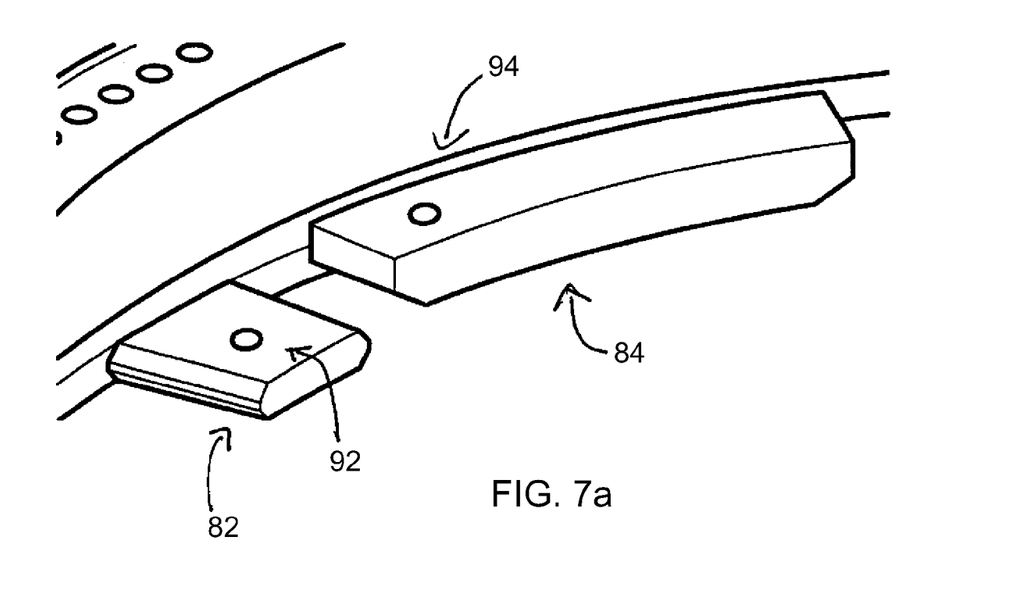
FIGS. 7a-7b illustrate another embodiment of the present invention.
Figure 7B:
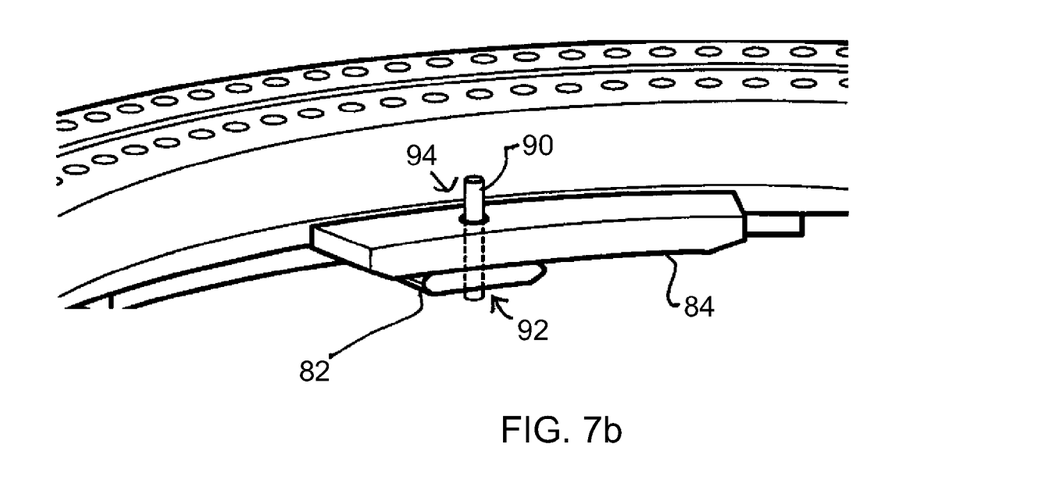

Referring to FIGS. 7*a*-7*b*, another option for combining a pitch brake system with a pitch lock system is to provide a brake disc element 82 with at least a first hole 92 and providing a brake pad 84 with at least a second hole 94, such that the first and second holes can be aligned (in a "maintenance position" of the blade) such that a pin 90 can be inserted through the holes for locking the pitch system. FIG. 7*a* shows the relative positions of the holes 92, 94 when the brake disk element 82 is not aligned with the brake pad 84. FIG. 7*b* shows the aligned holes 92, 94 with the pin 90 extending therethrough (maintenance position).

In other non-illustrated embodiments of the invention, the first and/or second brake pads may form 360° rings, so that contact is always maintained with the second braking element. In alternative embodiments, a brake disc element may form a 360° ring. The actuation of the pitch system may require more power in these embodiments, but in any pitch position, relative movement between blade and hub can be avoided. Also, in yet further embodiments, an actuator may be provided that increases the frictional force between the braking elements when the blade is in the below rated pitch position.

Furthermore, the embodiments of the present invention offer most advantages when used in an electrical pitch system, but could also be used in hydraulic pitch systems.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described before, but should be determined only by a fair reading of the claims that follow.

The invention claimed is:

1. A wind turbine rotor, comprising:
a hub,
a plurality of blades, and
at least one pitch system for rotating one of the blades along a longitudinal axis of the blade, the pitch system comprising one or more pitch brakes,
wherein the pitch brake comprises at least a brake disc element, a first brake pad, and a second brake pad, the brake disc element and the first and second brake pads comprising elastomer pads, and
wherein at least one of the hub or the blade comprises the brake disc element and the other one of the hub or the blade comprises the first brake pad,
wherein the brake disc element does not form a complete 360° annular disc, and
wherein the brake disc element and the first brake pad are arranged such that when the blade is in a predefined pitch position for wind speeds equal to and below nominal wind speed, the brake disc element and the first brake pad are in frictional contact with each other.

2. The wind turbine rotor according to claim 1, wherein at least one of the hub or the blade comprises the second brake pad, the second brake pad being arranged such that when the blade is in the predefined pitch position for wind speeds equal to and below nominal wind speed, the first and second brake pads are in frictional contact with the brake disc element.

3. The wind turbine rotor according to claim 1, wherein the first brake pad or the brake disc element is mounted on a pitch bearing inner or outer ring.

4. The wind turbine rotor according to claim 1, wherein the pitch brake is adapted to be used as a pitch lock system.

5. The wind turbine rotor according to claim 1, wherein the pitch system comprises at least two pitch brakes.

6. The wind turbine rotor according to claim 1, wherein the pitch brake comprises a fixed brake caliper including a caliper base and the first brake pad is mounted in the caliper base.

7. The wind turbine rotor according to claim 1, where the first brake pad is an elastomer pad.

8. The wind turbine rotor according to claim 1, wherein a default position of the first brake pad is adjustable.

9. The wind turbine rotor according to claim 1, wherein the brake disc element is in the shape of a tongue and occupies a sector of 15° or less.

10. The wind turbine rotor according to claim 1, wherein the brake disc element is in the shape of a tongue and occupies a sector of 10° or less.

11. The wind turbine rotor according to claim 2, wherein when the blade is in the predefined pitch position for wind speeds equal to or below nominal wind speed the brake disc element is positioned between the first and second brake pads.

12. The wind turbine rotor according to claim 2, wherein a default position of the first brake pad is adjustable.

13. The wind turbine rotor according to claim 4, wherein the brake disc element comprises at least a first hole and the first brake pad comprises at least a second hole, and wherein the first and second holes can be aligned such that a pin can be inserted through the holes for locking the pitch system.

14. The wind turbine rotor according to claim 4, wherein a brake caliper comprises the first brake pad and the brake caliper is further adapted for fitting a locking element on either side of the brake disc element.

15. The wind turbine rotor according to claim 6, wherein a second brake pad is mounted in the caliper base.

16. The wind turbine rotor according to claim 6, the fixed brake caliper further comprises a hydraulic or pneumatic circuit for increasing the frictional contact between the first brake pad and the brake disc element.

17. The wind turbine rotor according to claim 6, wherein the fixed brake caliper further comprises a compression spring for increasing the frictional contact between the first brake pad and the brake disc element.

18. A wind turbine rotor, comprising:
a hub,
a plurality of blades, and
at least one pitch system for rotating a blade along a longitudinal axis of the blade, the pitch system comprising one or more passive pitch brakes,
wherein the passive pitch brake comprises at least a brake disc element and a first brake pad, the brake disc element and the first brake pad comprising elastomer pads,
wherein at least one of the hub or the blade comprises the brake disc element and the other one of the hub or the blade comprises the first brake pad,
wherein the brake disc element does not form a complete 360° annular disc, and
wherein brake disc element and the first brake pad are arranged such that when the blade is in predefined pitch position for wind speeds equal to and below nominal wind speed, the brake disc element and the first brake pad are in frictional contact with each other.

19. The wind turbine rotor according to claim 18, wherein the brake disc element and first brake pad are arranged such that when the blade is not in the predefined pitch position for wind speeds equal to and below nominal wind speed, the brake disc element and first brake pad are not in frictional contact with each other.

* * * * *